United States Patent
Busuttil (12)

(10) Patent No.: US 6,344,626 B1
(45) Date of Patent: Feb. 5, 2002

(54) APPARATUS AND METHOD FOR LASER WELDING IN A HEMMER APPARATUS

(75) Inventor: Peter L. Busuttil, Troy, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 09/499,823

(22) Filed: Feb. 8, 2000

Related U.S. Application Data

(60) Provisional application No. 60/132,796, filed on May 6, 1999.

(51) Int. Cl.[7] ............................................. B23K 26/20
(52) U.S. Cl. ............................. 219/121.63; 219/121.64
(58) Field of Search ...................... 219/121.63, 121.64

(56) References Cited

U.S. PATENT DOCUMENTS

| | | | |
|---|---|---|---|
| 4,654,505 A | 3/1987 | Sciaky et al. | 219/121.63 |
| 4,661,677 A | 4/1987 | La Rocca | 219/121.64 |
| 4,916,284 A | 4/1990 | Petrick | |
| 5,115,115 A | 5/1992 | Alborante | |
| 5,131,710 A | 7/1992 | Kamiguchi et al. | 219/121.64 |
| 5,451,742 A | 9/1995 | Nishio et al. | 219/121.64 |
| 5,665,255 A | 9/1997 | Busuttil | |
| 5,897,796 A | 4/1999 | Forrest | 219/121.64 |

FOREIGN PATENT DOCUMENTS

| | | | |
|---|---|---|---|
| JP | 1-186222 | * | 7/1989 |
| JP | 6-285659 | * | 10/1994 |

* cited by examiner

*Primary Examiner*—Geoffrey S. Evans
(74) *Attorney, Agent, or Firm*—Young & Basile, P.C.

(57) ABSTRACT

A hemmer apparatus has at least one welding laser attached to the moveable crown for controlled welding of the hemmed panels to hold the panels with respect to one another, at least temporarily, and/or to maintain geometry between the panels until permanently fixed, such as when the adhesive cures or when additional welding is performed. Laser welding in the hemmer apparatus can be performed by providing relief in the steel used to form the hem, or by providing a tab in the hem material extending beyond the steel forming the hem, or a combination of the two, in order to allow access of the laser beam to the location where the geometry stabilizing tack weld is desired to be placed. Multiple welds are placed in spaced locations about the periphery of the hemmed panels as required for the specific application.

14 Claims, 1 Drawing Sheet

APPARATUS AND METHOD FOR LASER WELDING IN A HEMMER APPARATUS

This application claims the benefit of U.S. provisional application 60/132,796, filed May 6, 1999.

FIELD OF THE INVENTION

This present invention relates to a hemming apparatus for closures to be used on vehicles, such as trunks, deck lids, hoods, sliding doors, and other doors.

BACKGROUND OF THE INVENTION

Typically, a closure, such as a door includes an inner panel and an outer panel. The inner panel of a door is typically a thicker gage than the outer panel. The inner panel provides the structural integrity and support for hinges and the like, while the outer panel generally is considered to be a cosmetic outer skin. Structurally, everything is connected to the inner panel for support. When assembling the outer panel to the inner panel of a door, the two separate panels are positioned with respect to one another in a hemmer apparatus. In the hemmer apparatus, the outer peripheral edge of the outer panel is rolled and bent over the inner panel to connect the two panels to one another.

In the past, it was common to weld the outer panel to the inner panel, however, with thin gauge materials, welding produced visible defects in the outer panel which was unacceptable to automotive manufacturers. As a result, it became common to adhesively secure the inner and outer panels to one another. The adhesive bonding of the two panels has typically been accomplished with either a one part adhesive, or a two part epoxy adhesive. The one part epoxy adhesive is heat curable (requiring heat in excess of 240° in order to cure), while the two part epoxy adhesive is time sensitive and takes approximately 35 to 40 minutes to tack and fully cure within a day. Historically the hemmer apparatus brings the two panels together at a "marriage station" or a "hemmer station" and produces a seam all the way around and rounds out the edges so there are no sharp edges on the closure, and establishes the geometry that fits the inner and outer panels with respect to one another. There typically are no welds that take place inside a hemmer apparatus, so the inner and outer panels have a tendency to shift with respect to one another as the closure is processed along the production line. The biggest problem with the one part adhesive is that it doesn't cure until the body in white is painted, which raises the temperature sufficiently to cure the heat sensitive one part adhesive. Up until that point in time, the geometry of the inner panel with respect to the outer panel can shift and the curing process can set the final geometry of the two panels with respect to one another in an improper shifted relationship. The one part epoxy adhesive is desirable currently, since it costs approximately $5 per gallon.

The two part epoxy adhesive costs approximately $12 per gallon and is more difficult to apply, since two parts of the adhesive must be mixed and applied to one of the opposing surfaces of the closure. Furthermore, the two part epoxy adhesive tack cures in approximately 30 minutes. While this is significantly faster than the one part adhesive, it does not guarantee accurate positioning of the two panels with respect to one another. For example, if an operator takes the assembled inner and outer panels out of the hemmer and places the assembly on a rack, the two panels may shift with respect to one another prior to the two part epoxy adhesive curing completely. Since the one part adhesive is more desirable from a cost perspective, the industry has attempted to quickly heat cure at least portions of the one part adhesive by applying localized heat to limited portions of the panel assembly at a work station immediately after the hemmer apparatus. Heat coils typically were provided at predetermined locations around the periphery of the panel assembly in order to cure localized areas of the one part adhesive prior to further processing of the panel assembly. While this procedure was an improvement, it still did not guarantee accurate and true positioning of the inner panel with respect to the outer panel. The assembled panels were still subject to dislocation with respect to one another while being transferred from the hemmer apparatus to the localized heat application work station.

SUMMARY OF THE INVENTION

It is desirable in the present invention to temporarily fix the relative position and geometry of the inner panel and the outer panel while in the geometry fixture of the hemmer apparatus, so that the orientation of the assembled panels with respect to one another is not lost prior to curing of the one part adhesive. The present invention welds the inner panel and the outer panel with respect to one another in a plurality of locations around the peripheral, folded-over, hemmed edge while the panels are held in the proper geometry with respect to one another in the hemmer apparatus. The laser weld according to the present invention can include a fillet weld on the peripheral edge of the return of the hem between the inner panel and the outer panel and/or a spot weld on the return of the hem. In the present invention, this is referred to as a geometry weld. The present invention provides a plurality of geometry welds to freeze the geometry while still using an adhesive, such as the one part adhesive to provide the permanent connection between the panels after curing. The manufacturing tack weld according to the present invention holds the relationship between the inner panel and the outer panel until the adhesive is cured in the paint oven.

Alternatively, according to the present invention the adhesive can be eliminated and the structure of the door can be permanently welded at a station immediately following the hemmer apparatus where the manufacturing tack welds are provided to freeze the geometry. In either case, a plurality of tack welds, such as four, six, eight, or more, depending on the configuration of the two panels, are provided to establish and maintain the geometry between the inner panel and the outer panel during assembly. The plurality of tack welds are provided in the hemmer apparatus where the geometry is established, the hems are rolled over, and optics are provided at various locations to put the weld into the hem of the assembly while still maintained with the proper geometry in the hemmer station. The manufacturing tack geometry welds are provided at spaced locations around the periphery to lock the geometry of the assembly in place.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
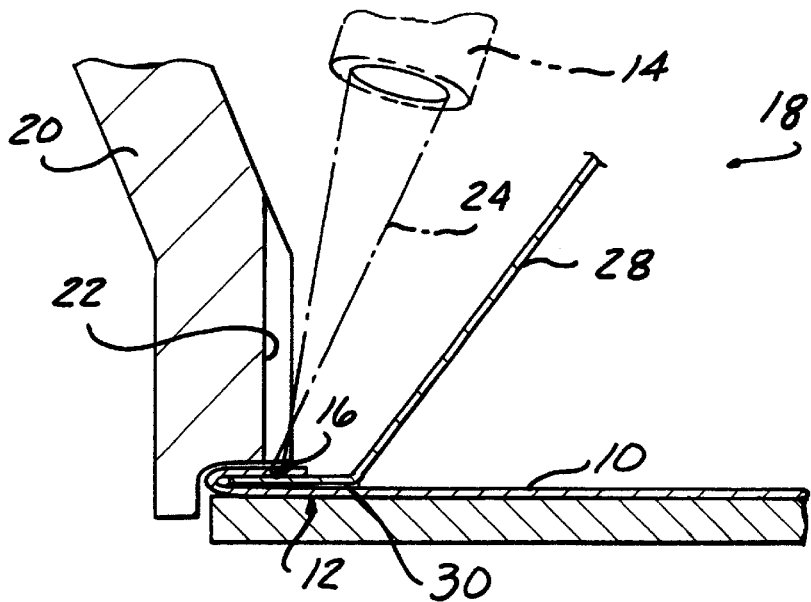
FIG. 1 is a simplified cross section showing a hem formed on a first panel folded over a second panel and laser welding a geometry weld in the hem in cooperation with a clearance formed in the steel performing the hemming operation.
Figure 2:
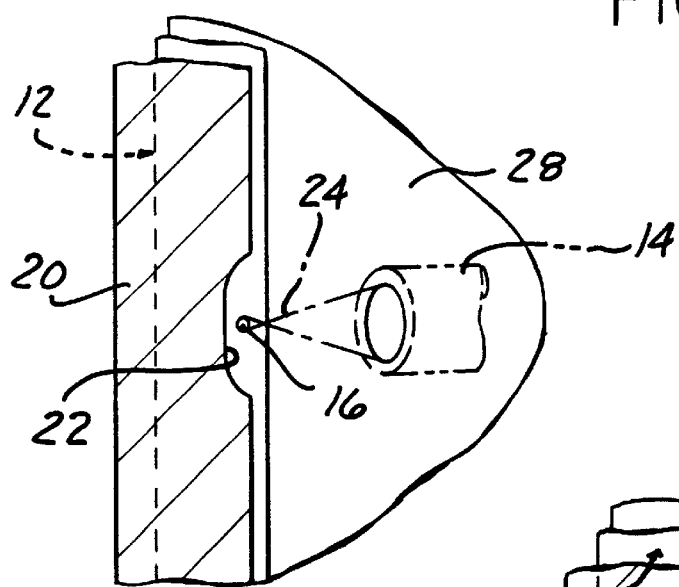
FIG. 2 is a plan view of the clearance formed in the steel allowing access by the laser for welding.
Figure 3:
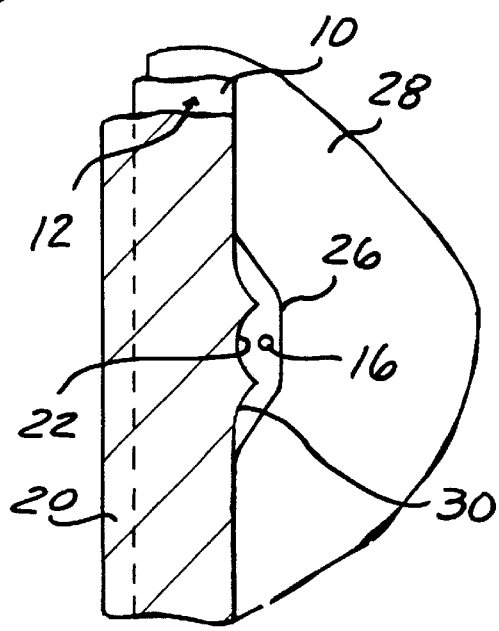
FIG. 3 is an alternative plan view of clearance formed by a "claw" formed in the steel to provide sufficient contact between the hem and the panel to be welded by the laser on a tab formed on the hem.

In practicing the present invention it is desirable to reduce or eliminate any ripple or damage that can occur on the outer panel 10 when attempting to weld in the proximity of the hem 12. To avoid these problems, the present invention provides precise control of the laser welder 14. This permits the geometry tack welds 16 to occur in the hemmer apparatus 18 itself. Traditionally, the hemmer apparatus 18 comes in and toggles first at about 45° and then cams roll over in the same motion to roll the hem 12 over. Then the press comes in and the steel 20 flattens out the hemmed portion 12.

In order to provide the laser weld 16 in the hem portion 12 of the assembled panels, a relief 22 is provided in the steel 20 of the hemmer apparatus 18 to allow access of the laser beam 24 to the hem 12 to be welded. The stationary laser beam 24 is in a predetermined position and focused to contact the surface in the desired pattern for welding. This application of the laser light from a stationary position can be accomplished with very little clearance area. The focal length of the laser optics is approximately 200 millimeters (12½ inches). Multiple optics can be connected to a single laser with multiple fibers positioned at various locations as desired around the hemmer apparatus 18 for the work piece to be tack welded together in order to freeze the geometry in the hemmer apparatus 18. In performing the weld 16, the process takes approximately 0.3 seconds per weld. The single laser is shuttled between the plurality of optics, generally one at a time to reduce power, so that the laser time is shared between the fiber optics. Laser time durations are a function of the power available, and can be knocked down significantly with increased power, such as to 0.15 or 0.1 second for the laser shot.

In applying the geometry tack weld 16, the desired position is on the return of the hem 12 and is approximately 3/16 inch in diameter. The weld geometry can be between 3/16 of inch to 1/8 of an inch for the tack weld 16. Relief 22 is provided in the steel 20 forming the return hem 12, such as a conical cutout in the steel 20 to accommodate the laser beam 24 contact with the surface of the return hem 12 in order to form the tack weld 16. Alternatively, a tab 26 can be formed on the hem 12 extending external of the steel 20 to accommodate reception of the tack weld 16 without modifying the steel 20 used in the hemmer apparatus 18.

In order to perform a satisfactory weld 16, the two pieces of metal, the inner panel 28 and the outer panel 10, must be contact with one another. Additional features, such as "crows feet" 30 can be provided in the steel 20 itself to push down into the area where the weld 16 is desired. In the hemmer apparatus 18, the pressure is carefully set in order to properly account for steel spring back while maintaining the desired geometry of the assembled panels 10, 28. If excess force is provided to the hem portion 12 of the assembled panels 10, 28, distortion can be seen on the outer panel 10, and consequently it is considered a critical geometry area by automotive parts manufacturers and the pressure applied is carefully controlled, which allows control of the two metal touch points required for the weld to be successful.

If there is enough time in the hemmer apparatus 18 dwell cycle, additional welds 16 can be provided. The laser 14 is connected to the hemmer apparatus 18 crown and moves up and down along with the steel beam 20 forming the hem 12 in the assembled panels 10, 28. A laser beam 24 sharply focused can be between approximately 0.3 and 0.6 millimeters in diameter. For the present invention to provide a 1/8 inch diameter or 3/16 inch diameter weld 16, the laser beam 24 is defocused in order to provide for a larger tack weld 16. Even though the beam 24 is defocused, it still provides strong enough power to accomplish the desired tack weld 16. Defocusing the laser beam 24 decreases the power density and, therefore, the dwell time is increased to approximately 0.2 seconds.

A hemmer apparatus 18 according to the present invention has at least one welding laser 14 attached to the moveable crown for controlled welding of the hemmed panels to hold the panels 10, 28 with respect to one another, at least temporarily, and/or to maintain geometry between the panels until permanently fixed, such as when the adhesive 30 cures. Laser welding in the hemmer apparatus 18 provides a unique solution to the problems associated with the prior known assembly processes for moveable closure panels.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hemmer apparatus having a moveable crown for hemming a joint between first and second panels held in a fixed geometry with respect to one another at a hemming work station comprising:

at least one welding laser for controlled welding of the hemmed panels at the hemming work station to hold the panels in a fixed geometry with respect to one another, at least temporarily, until permanently fixed; and a rigid hem-forming member used to form the hemmed joint having a relief formed therein to provide access to a location of the hemmed joint to be laser welded.

2. The hemmer apparatus of claim 1 further comprising the welding laser attached to the moveable crown.

3. The hemmer apparatus of claim 1 further comprising the permanent fixing of the panels with respect to one another occurring when an adhesive disposed between the panels at the hemmed joint cures.

4. The hemmer apparatus of claim 1 further comprising the permanent fixing of the panels with respect to one another occurring when additional welding is performed on the hemmed joint.

5. The hemmer apparatus of claim 1 further comprising a rigid hem-forming member used to form the hemmed joint having a relief formed therein to provide access to a location of the hemmed joint to be laser welded.

6. The hemmer apparatus of claim 1 further comprising at least one of the panels having a tab formed thereon in a vicinity of the hemmed joint to be formed and extending beyond a rigid hem-forming member forming the hemmed joint in order to allow access of a laser beam to a location where welding is desired to be placed.

7. The hemmer apparatus of claim 1 further comprising multiple welds placed in spaced locations about the periphery of the hemmed panels.

8. A method for hemming a joint with a hemmer apparatus having a moveable crown, said hemmed joint formed between first and second panels held in a fixed geometry with respect to one another at a hemming work station comprising the steps of:

folding at least a portion of a peripheral edge of one panel over with respect to an edge of the other panel to define an overlapping hem joint;

welding at least one spot of the overlapping hem joint with at least one welding laser for controlled welding of the hemmed panels at the hemming work station to hold the panels in a fixed geometry with respect to one another, at least temporarily, until permanently fixed; and forming the hemmed joint with a rigid hem-forming member having a relief formed therein to provide access to a location of the hemmed joint to be laser welded.

9. The method of claim 8 further comprising the step of moving the welding laser with the moveable crown.

10. The method of claim 8 further comprising the step of permanently fixing the panels with respect to one another when an adhesive disposed between the panels at the hemmed joint cures.

11. The method of claim 8 further comprising the step of permanently fixing the panels with respect to one another when additional welding is performed on the hemmed joint.

12. The method of claim 8 further comprising the step of forming the hemmed joint with a rigid hem-forming member having a relief formed therein to provide access to a location of the hemmed joint to be laser welded.

13. The method of claim 8 further comprising the step of forming a tab on at least one of the panels in a vicinity of the hemmed joint to be formed and extending beyond a rigid hem-forming member forming the hemmed joint in order to allow access of a laser beam to a location where welding is desired to be placed.

14. The method of claim 8 further comprising the step of placing multiple welds in spaced locations about the periphery of the hemmed panels.

\* \* \* \* \*